US010558547B2

(12) United States Patent
Coatney et al.

(10) Patent No.: US 10,558,547 B2
(45) Date of Patent: Feb. 11, 2020

(54) METHODS FOR PROACTIVE PREDICTION OF DISK FAILURE IN A RAID GROUP AND DEVICES THEREOF

(71) Applicant: NetApp, Inc., Sunnyvale, CA (US)

(72) Inventors: Douglas Coatney, San Jose, CA (US); Rebecca Kekelishvili, Staten Island, NY (US); Minh Pham, Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 57 days.

(21) Appl. No.: 15/166,862

(22) Filed: May 27, 2016

(65) Prior Publication Data

US 2017/0344431 A1 Nov. 30, 2017

(51) Int. Cl.
*G06F 11/00* (2006.01)
*G06F 11/34* (2006.01)
*G06F 11/07* (2006.01)
*G06F 11/30* (2006.01)

(52) U.S. Cl.
CPC ........ *G06F 11/3452* (2013.01); *G06F 11/004* (2013.01); *G06F 11/0754* (2013.01); *G06F 11/3034* (2013.01); *G06F 2201/81* (2013.01)

(58) Field of Classification Search
CPC ............ G06F 11/1451; G06F 11/2056; G06F 11/2094; G06F 11/3034; G06F 11/3495; G06F 11/0754
See application file for complete search history.

(56) References Cited

U.S. PATENT DOCUMENTS

| 5,832,199 A | * | 11/1998 | Apperley | G06F 11/008 714/6.31 |
|---|---|---|---|---|
| 7,457,725 B1 | * | 11/2008 | Civilini | G06F 11/008 702/181 |
| 8,140,914 B2 | * | 3/2012 | Murphy | G06F 11/1461 714/47.1 |
| 9,229,796 B1 | * | 1/2016 | Ma | G06F 11/008 |
| 2007/0079170 A1 | * | 4/2007 | Zimmer | G06F 11/008 714/6.23 |
| 2009/0271657 A1 | * | 10/2009 | McCombs | G06F 11/004 714/6.2 |

(Continued)

OTHER PUBLICATIONS

Salfner et al., "A Survey of Online Failure Prediction Methods", ACM Computing Surveys, vol. 42, No. 3, Article 10, Mar. 2010 (Year: 2010).*
Murray et al., "Machine Learning Methods for Predicting Failures in Hard Drives: A Multiple-Instance Application", Journal of Machine Learning Reserach 6, May 2005, pp. 783-816 (Year: 2005).*

(Continued)

*Primary Examiner* — Michael Maskulinski
(74) *Attorney, Agent, or Firm* — Pepper Hamilton LLP

(57) ABSTRACT

A method, non-transitory computer readable medium, and device that assists with proactive prediction of disk failure in a RAID group includes obtaining performance data for a plurality of storage drives. The obtained performance data is compared with a stored classification data to predict one or more storage drives of the plurality of storage drives failing within a time period. The data present in the one or more storage drives predicted to fail based on the comparison is copied on to one or more secondary storage drives. A notification including a list of the one or more storage drives predicted to fail is sent upon the copying the data on to the one or more secondary storage drives.

12 Claims, 4 Drawing Sheets

(56) References Cited

U.S. PATENT DOCUMENTS

| | | | |
|---|---|---|---|
| 2014/0189440 A1* | 7/2014 | Ba | G06F 17/00 714/47.3 |
| 2015/0074467 A1* | 3/2015 | Jacoby | G06F 11/3034 714/47.1 |
| 2015/0205657 A1* | 7/2015 | Clark | G06F 11/008 714/47.3 |
| 2015/0212760 A1* | 7/2015 | Goel | G06F 3/0689 714/6.3 |
| 2015/0234719 A1* | 8/2015 | Coronado | G06F 11/203 714/6.3 |
| 2016/0239361 A1* | 8/2016 | Vlassarev | G06F 11/0727 |
| 2016/0239395 A1* | 8/2016 | Madsen | G06F 11/2069 |
| 2016/0335166 A1* | 11/2016 | George | G06F 11/2094 |
| 2017/0286176 A1* | 10/2017 | Artman | G06F 9/5027 |
| 2018/0032405 A1* | 2/2018 | Chen | G06F 11/1451 |

OTHER PUBLICATIONS

Agrawal et al., "Discovering Rules from Disk Events for Predicting Hard Drive Failures", 2009 International Conference on Machine Learning and Applications, Dec. 13-15, 2009 (Year: 2009).*

Pitakrat et al., "A Comparison of Machine Learning Algorithms for Proactive Hard Disk Drive Failure Detection", Jun. 19, 2013, ISARCS 2013, Vancouver (Year: 2013).*

Salfner et al., "A Survey of Online Failure Prediction Methods", ACM Computing Surveys, vol. 42, No. 3, Article 10, Publication date : Mar. 2010 (Year: 2010).*

Murray et al., "Hard drive failure prediction using non-parametric statistical methods", Proc. ICANN/ICONIP 2003, Istanbul, Turkey (Year: 2003).*

Hughes et al., "Improved Disk-Drive Failure Warnings", IEEE Transactions On Reliability, vol. 51, No. 3, Sep. 2002, pp. 350-357 (Year: 2002).*

* cited by examiner

METHODS FOR PROACTIVE PREDICTION OF DISK FAILURE IN A RAID GROUP AND DEVICES THEREOF

FIELD

This technology generally relates to data storage management and, more particularly, methods for proactive prediction of disk failure in a RAID group and devices thereof.

BACKGROUND

Data storage utilization is continually increasing, causing the proliferation of storage systems in data centers. Monitoring and managing these systems require increasing amounts of human resources. Organizations often operate reactively, taking action only when systems reach capacity or fail, at which point performance degradation or failure has already occurred.

For example, hard disk failures fall into one of two basic classes: predictable failures; and unpredictable failures. Predictable failures result from slow processes, such as mechanical wear and gradual degradation of storage surfaces. Monitoring can determine when such failures are becoming more likely. However, unpredictable failures happen suddenly and without warning and are mainly due to frequent data operations that exceed operational capacity of the hard disk. Therefore when a hard disk actually fails during an unpredictable failure, the data is lost from the hard disk and is no longer accessible to a client device for a certain period of time.

DETAILED DESCRIPTION

Figure 1:
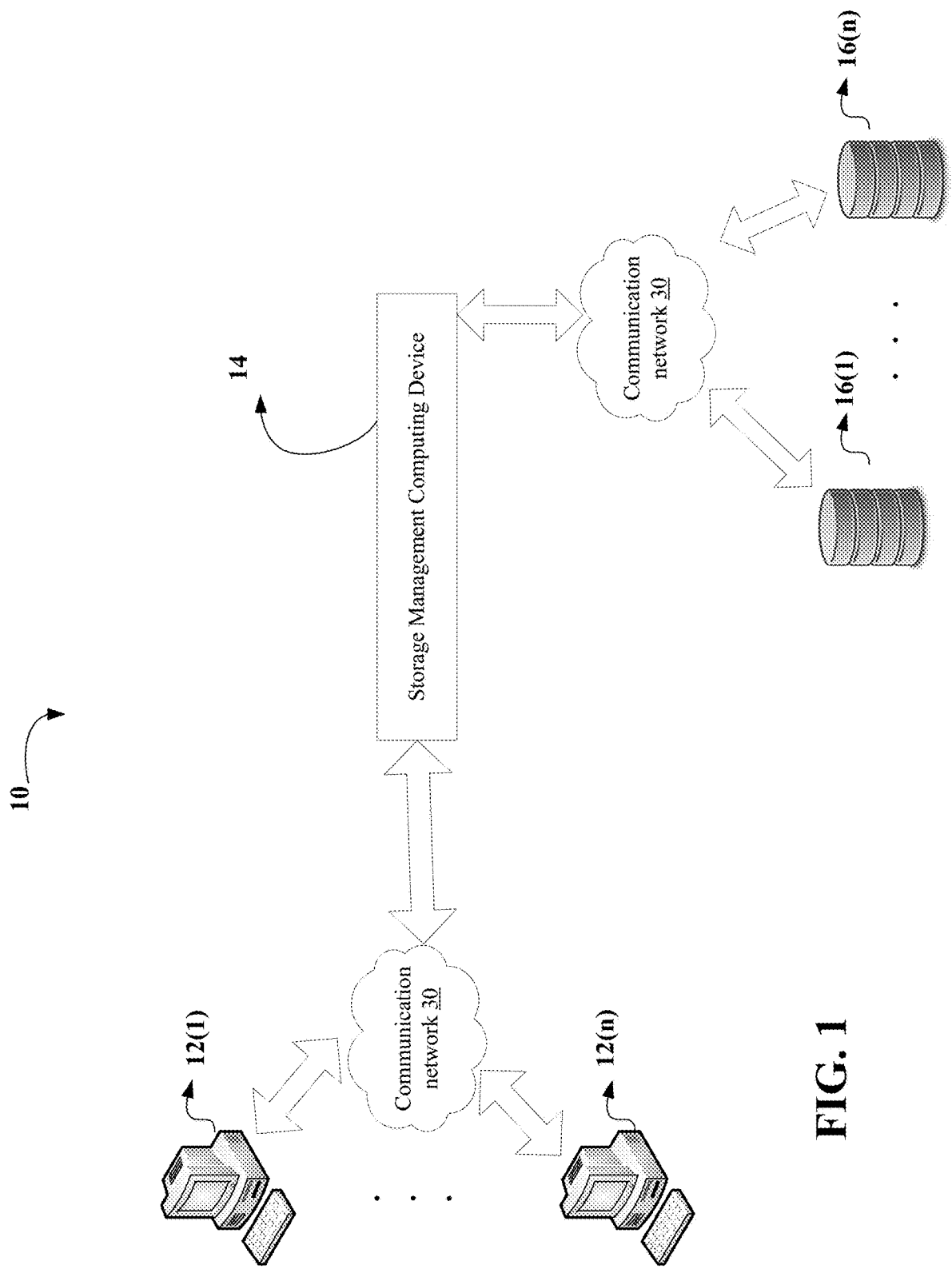
FIG. 1 is a block diagram of an environment with a storage management computing device that provides proactive prediction of disk failure in a RAID group.

An environment 10 with a plurality of client computing devices 12(1)-12(n), an exemplary storage management computing device 14, a plurality of storage drives 16(1)-16(n) is illustrated in FIG. 1. In this particular example, the environment 10 in FIG. 1 includes the plurality of client computing devices 12(1)-12(n), the storage management computing device 14 and a plurality of storage drives 16(1)-16(n) coupled via one or more communication networks 30, although the environment could include other types and numbers of systems, devices, components, and/or other elements. The example of a method for proactive prediction of disk failure in a RAID group is executed by the storage management computing device 14, although the approaches illustrated and described herein could be executed by other types and/or numbers of other computing systems and devices. The environment 10 may include other types and numbers of other network elements and devices, as is generally known in the art and will not be illustrated or described herein. This technology provides a number of advantages including providing methods, non-transitory computer readable media and devices for proactive prediction of disk failure in a RAID group.

Figure 2:
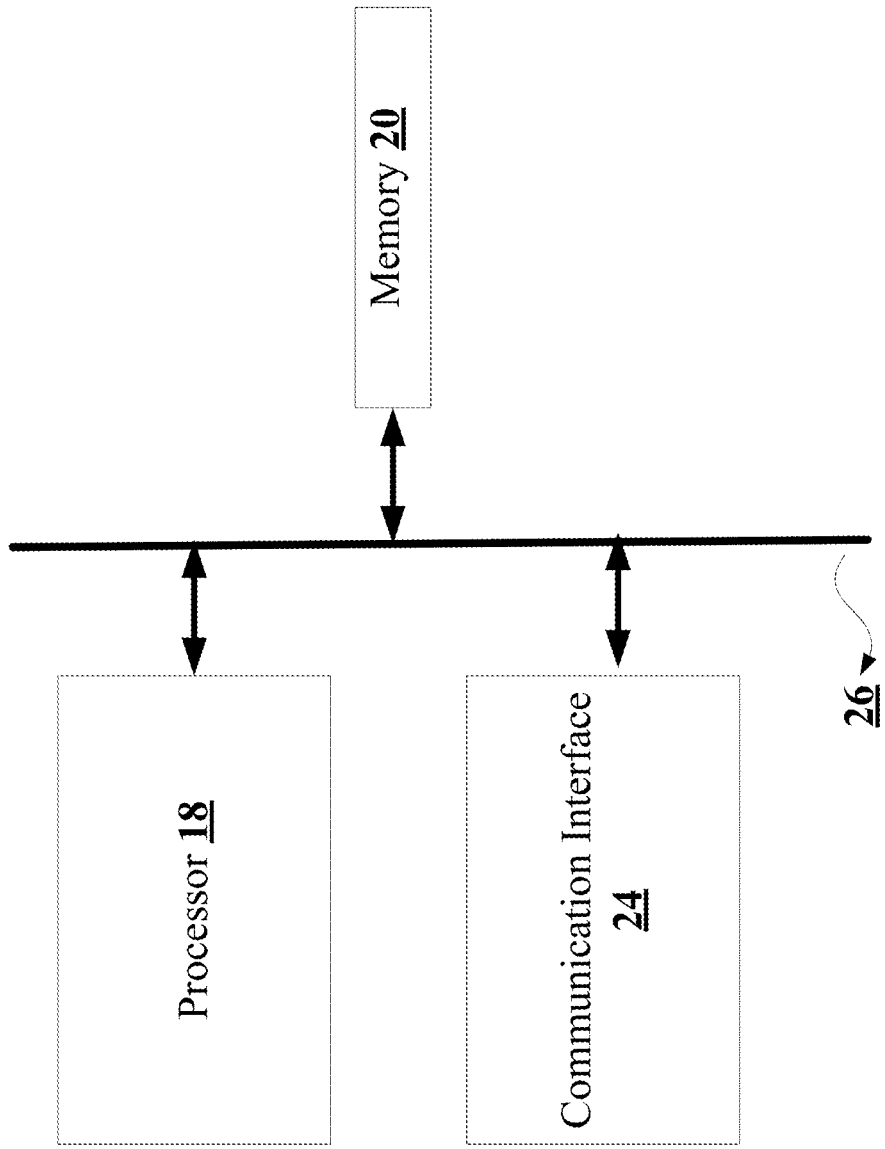
FIG. 2 is a block diagram of the exemplary storage management computing device shown in FIG. 1.
Figure 3:
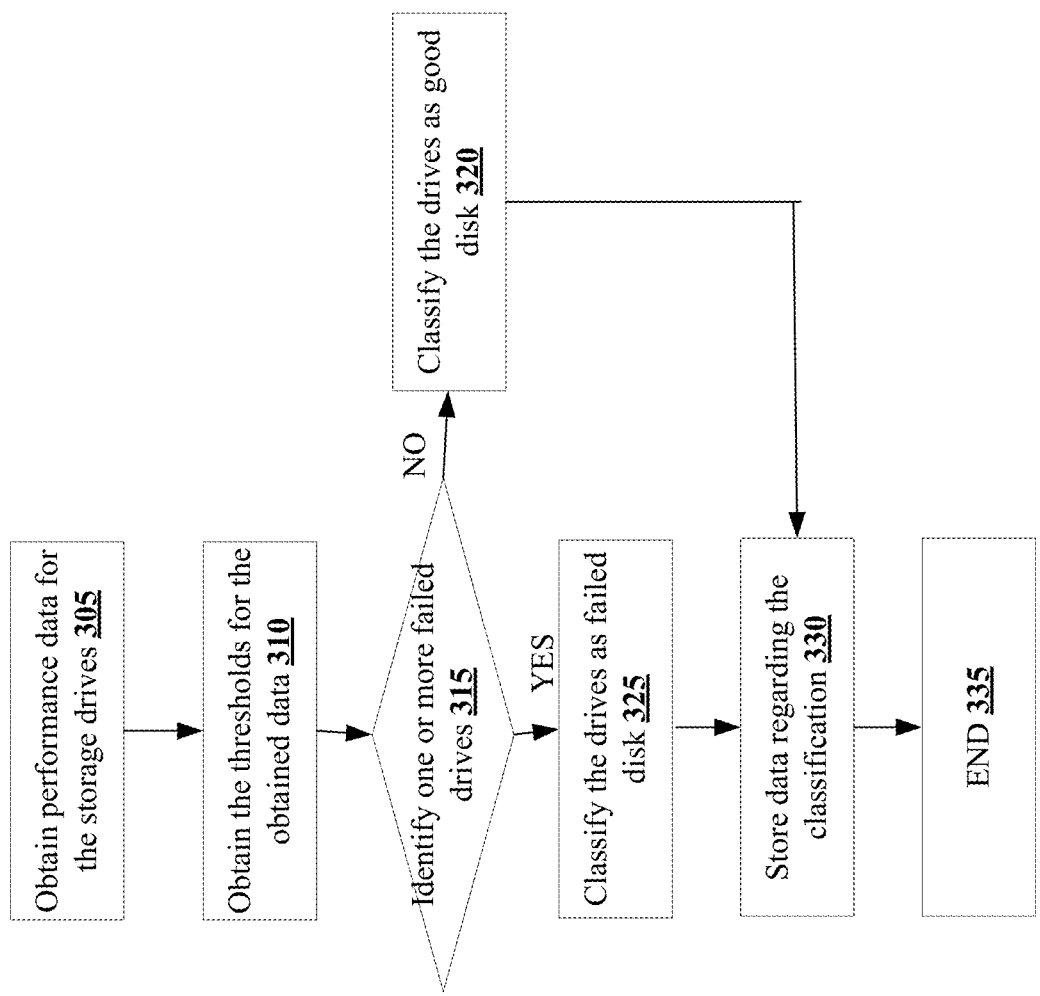
FIGS. 3-4 are exemplary flow charts of an example of a method for proactive prediction of disk failure in a RAID group.

Referring to FIG. 2, in this example the storage management computing device 14 includes a processor 18, a memory 20, and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for proactive prediction of disk failure in a RAID group as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a non-volatile memory, random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication interface 24 of the storage management computing device 14 operatively couples and communicates with the plurality of client computing devices 12(1)-12(n) and the plurality of storage drives 16(1)-16(n), which are all coupled together by the communication network 30, although other types and numbers of communication networks or systems with other types and numbers of connections and configurations to other devices and elements. By way of example only, the communication network 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a universal serial bus, although other bus types and links may be used, such as PCI-Express or hyper-transport bus.

Each of the plurality of client computing devices 12(1)-12(n) includes a central processing unit (CPU) or processor, a memory, and an I/O system, which are coupled together by a bus or other link, although other numbers and types of network devices could be used. The plurality of client computing devices 12(1)-12(n) communicates with the storage management computing device 14 for storage management, although the client computing devices 12(1)-12(n) can interact with the storage management computing device 14 for other purposes. By way of example, the plurality of client computing devices 12(1)-12(n) may run application(s) that may provide an interface to make requests to access, modify, delete, edit, read or write data within storage management computing device 14 or the plurality of storage drives 16(1)-16(n) via the communication network 30.

Each of the plurality of storage drives 16(1)-16(n) includes a central processing unit (CPU) or processor, and an I/O system, which are coupled together by a bus or other link, although other numbers and types of network devices could be used. Each plurality of storage drives 16(1)-16(n) assists with storing data, although the plurality of storage drives 16(1)-16(n) can assist with other types of operations such as storing of files or data. Various network processing applications, such as CIFS applications, NFS applications, HTTP Web Data storage device applications, and/or FTP applications, may be operating on the plurality of storage drives 16(1)-16(n) and transmitting data (e.g., files or web pages) in response to requests from the storage management computing device 14 and the plurality of client computing devices 12(1)-12(n). It is to be understood that the plurality of storage drives 16(1)-16(n) may be hardware or software or may represent a system with multiple external resource servers, which may include internal or external networks.

Although the exemplary network environment 10 includes the plurality of client computing devices 12(1)-12(n), the storage management computing device 14, and the plurality of storage drives 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for proactive prediction of disk failure in a RAID group will now be described herein with reference to FIGS. 1-4. The exemplary method beings at step 305 where the storage management computing device 14 obtains performance data associated with each of the plurality of storage drives 16(1)-16(n), although the storage management computing device 14 can obtain other types or amounts of data associated with the plurality of storage drives 16(1)-16(n). In this example, the performance data includes the number of functioning hours of the drives, number of blocks that the drives read and write, latency between when the drives receive a request for data and complete the received request, serial number of the drives, number of input/output read and write operation received and performed, although the performance data can include other types or amounts of information.

Next in step 310, the storage management computing device 14 obtains the threshold value associated with each of the obtained performance data from the memory 20, although the storage management computing device 14 can obtain the threshold from other memory locations. By way of example, the storage management computing device 14 obtains the threshold for the number of: the number of functioning hours of the drives, number of blocks that the drives read and write, latency between when the drives receive a request for data and complete the received request, serial number of the drives, number of input/output read and write operation received and performed, although the storage management computing device 14 can obtain other types or numbers of thresholds. Alternatively in another example, the threshold value for each of the obtained performance data obtained by the storage management computing device 14 can be a range of threshold values. Additionally in this example, the threshold value can be adjusted by the storage management computing device 14 based on the type of the plurality of storage drives 16(1)-16(n), although the storage management computing device 14 can adjust the threshold value based on other types or amounts of parameters.

Next in step 315, the storage management computing device 14 determines whether at least one of the plurality of storage drives 16(1)-16(n) has failed by comparing the obtained performance data of each of the plurality of storage drives 16(1)-16(n) against the obtained threshold value for each of the obtained performance data. In this example, when at least one of the obtained performance data is greater than its associated threshold value, then the storage drive is determined to have failed. Alternatively in another example, the storage drive can be determined to have failed when a certain number of the obtained performance data is greater than its associated threshold value. In yet another example, the storage drive can be determined to have failed when all of the obtained performance data is greater than its associated threshold value. Accordingly in this example, when the storage management computing device 14 determines that none of the plurality of storage drives 16(1)-16(n) has failed, then the No branch is taken to step 320.

In step 320, the storage management computing device 14 classifies the plurality of storage drives 16(1)-16(n) as good or non defective drives and the exemplary flow proceeds to step 330 which will be further illustrated below.

However back in step 315, when the storage management computing device 14 determines that at least one of the plurality of storage drives 16(1)-16(n) has failed, then the Yes branch is taken to step 325.

In step 325, the storage management computing device 14 classifies the failed one of the plurality of storage drives 16(1)-16(n) as a failed drive, defective drive or a bad drive. Additionally in this example, the storage management computing device 14 temporarily suspends the operation of the drive classified as a failed drive from the plurality of storage drives 16(1)-16(n). By suspending the operation on the actually failed disk, the technology is able to prevent an error that could occur while performing data operation on the storage drive thereby providing better user experience to the plurality of client computing devices 12(1)-12(n).

Next in step 330, the storage management computing device 14 stores the classification data relating to the comparison of the obtained performance data against the threshold and the resulting classification so that this stored data can be used in the future to predict failure of the storage drives and the exemplary method ends at step 335.

Figure 4:
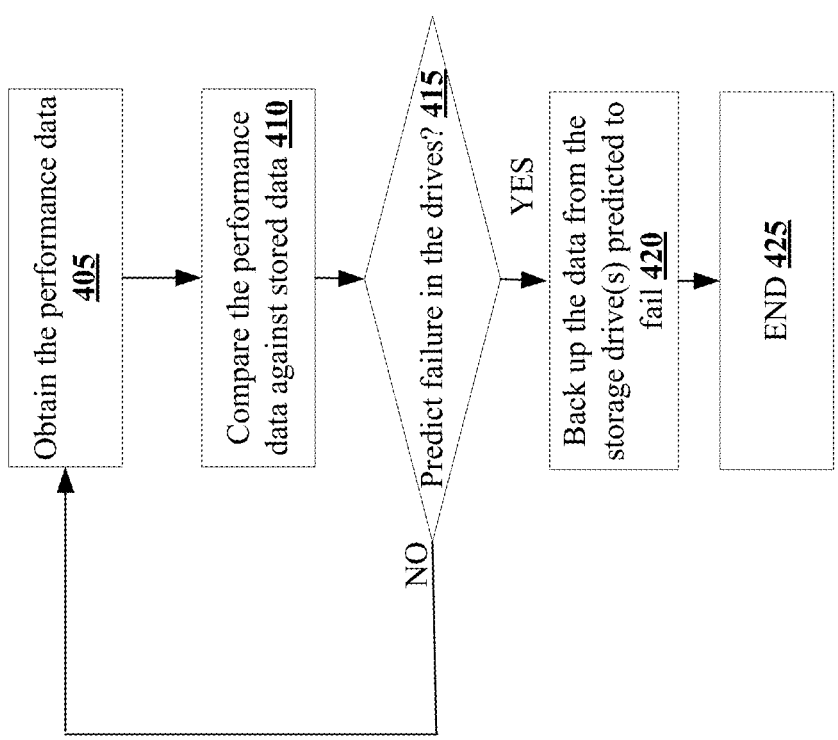

Now an exemplary method for using the stored data relating to the comparison of the obtained performance against the threshold will now be illustrated with reference to FIG. 4. First in step 405, the storage management computing device 14 where the storage management computing device 14 obtains performance data associated with each of the plurality of storage drives 16(1)-16(n), although the storage management computing device 14 can obtain other types or amounts of data associated with the plurality of storage drives 16(1)-16(n). In this example, the performance data includes the number of functioning hours of the drives, number of blocks that the drive reads and writes, latency between when the drive receives a request for data and completes the received request, serial number of the drive, number of input/output read and write operation receives and performed, although the performance data can include other types or amounts of information.

Alternatively, the storage management computing device 14 can also obtain the threshold value associated with each of the obtained performance data from the memory 20, although the storage management computing device 14 can obtain the threshold from other memory locations. By way of example, the storage management computing device 14 obtains the threshold for the number of: the number of functioning hours of the drives, number of blocks that the drive reads and writes, latency between when the drive receives a request for data and completes the received request, serial number of the drive, number of input/output read and write operation receives and performed, although the storage management computing device 14 can obtain other types or numbers of thresholds. Alternatively in another example, the threshold for each of the obtained performance data obtained by the storage management computing device 14 can be a range of threshold values. Additionally in this example, the threshold value can be adjusted by the storage management computing device 14 based on the type of the plurality of storage drives 16(1)-16(n), although the storage management computing device 14 can adjust the threshold value based on other types or amounts of parameters.

Next in step 410, the storage management computing device 14 compares the obtained performance data of each of the plurality of storage drives 16(1)-16(n) against the stored classification data illustrated above in step 330. In this example, the storage management computing device 14 compares the obtained performance data against stored classification data to predict any possible failures. By way of example, the storage management computing device 14 compares the obtained performance data against the stored performance data and the corresponding classification of whether it was a good non-defective drive or a defective drive to predict when one of the storage drives is going to fail in the future.

In step 415, the storage management computing device 14 based on the comparison determines when there are one or more of the plurality of storage drives 16(1)-16(n) that can fail in the immediate future. Accordingly, when the storage management computing device 14 determines that there are no plurality of storage drives 16(1)-16(n) predicted to fail in the near future, then the No branch is taken back to step 405. However, when the storage management computing device 14 determines that there is at least one of plurality of storage drives 16(1)-16(n) predicted to fail in the near future, then the Yes branch is taken to step 420.

In step 420, the storage management computing device 14 stores the backup of the storage drives in the plurality of storage drives 16(1)-16(n) that are predicted to fail in the previous steps 410-415 and the exemplary method ends in step 425. Additionally in this example, the storage management computing device 14 can also send out a notification or data being displayed on the command line prompt with the list of storage drives that are predicted to fail to the administrator.

Accordingly, as illustrated and described by way of the examples herein, this technology provides a number of advantages including providing methods, non-transitory computer readable media and devices for proactive prediction of disk failure in a RAID group. Using the technique illustrated above, the technology disclosed is able to accurately predict storage drives that can fail in the future based on the current performance data. Additionally using this technique, the technology is also able to back up the data from the storage drives that are predicted to fail on to a secondary storage drive so that the data is always made accessible to the plurality of client computing devices 12(1)-12(n) without any down time.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
predicting, by a computing device, which of a plurality of storage drives will fail within a time period based on comparing each element of current performance data of each of the storage drives against a set corresponding one of a plurality of threshold values, wherein at least one of the set corresponding one of the threshold values for a number of drive functioning hours is further adjusted based on a type of at least one of the storage drives;
copying, by the computing device, data present in one or more of the storage drives predicted to fail on to at least one of a plurality of secondary storage drives; and
sending, by the computing device, a notification of the one or more storage drives predicted to fail upon the copying of the data on to the at least one of the secondary storage drives.

2. The method as set forth in claim 1 further comprising:
comparing, by the computing device, the current performance data for at least one of the storage drives with the set corresponding threshold value to identify a current failure in the storage drives.

3. The method as set forth in claim 2 further comprising:
identifying and classifying, by the computing device, one of the storage drives which has the current performance data that exceeds the set corresponding threshold value as a defective storage drive.

4. The method as set forth in claim 3 further comprising:

identifying and classifying, by the computing device, at least one of the storage drives which has the current performance data below the set corresponding threshold value as a non-defective storage drive.

5. A non-transitory computer readable medium having stored thereon instructions for proactive prediction of disk failure in a RAID group comprising executable code which when executed by a processor, causes the processor to perform steps comprising:

predicting which of plurality of storage drives will fail within a time period based on comparing each element of current performance data of each of the storage drives against a set corresponding one of a plurality of threshold values, wherein at least one of the set corresponding one of the threshold values for a number of drive functioning hours is further adjusted based on a type of at least one of the storage drives;

copying data present in one or more of the storage drives predicted to fail on to at least one of a plurality of secondary storage drives; and sending a notification of the one or more of storage drives predicted to fail upon the copying of the data on to the at least one of the secondary storage drives.

6. The medium as set forth in claim 5 further comprising:

comparing the current performance data for at least one of the storage drives with the set corresponding threshold value to identify one or more current failures in the storage drives.

7. The medium as set forth in claim 6 further comprising:

identifying and classifying one of the storage drives which has the current performance data that exceeds the set corresponding threshold value as a defective storage drive.

8. The medium as set forth in claim 7 further comprising:

identifying and classifying at least one of the storage drives which has the current performance data below the set corresponding threshold value as a non-defective storage drive.

9. A computing device comprising:

a processor;

a memory coupled to the processor which is configured to be capable of executing programmed instructions comprising and stored in the memory to:

predict which of one or more of storage drives will fail within a time period based on comparing each element of current performance data of each of the storage drives against a set corresponding one of a plurality of threshold values, wherein at least one of the set corresponding one of the threshold values for a number of drive functioning hours is further adjusted based on a type of at least one of the storage drives;

copy data present in the one or more storage drives predicted to fail on to at least one of a plurality of secondary storage drives; and send a notification of the one or more storage drives predicted to fail upon the copying of the data on to the at least one of the secondary storage drives.

10. The device as set forth in claim 9 wherein the processor coupled to the memory is further configured to be capable of executing at least one additional programmed instruction comprising and stored in the memory to the comparing further comprises:

compare the current performance data for at least one of the storage drives with the set corresponding threshold value to identify one or more current failures in the storage drives.

11. The device as set forth in claim 10 wherein the processor coupled to the memory is further configured to be capable of executing at least one additional programmed instruction comprising and stored in the memory to:

identify and classify one of the storage drives which has the current performance data that exceeds the set corresponding threshold value as a defective storage drive.

12. The device as set forth in claim 10 wherein the processor coupled to the memory is further configured to be capable of executing at least one additional programmed instruction comprising and stored in the memory to:

identify and classify at least one of the storage drives which has the current performance data below the set corresponding threshold value as a non-defective storage drive.

* * * * *